2,993,867
PROCESS FOR DESTROYING FOAM
Abraham Wilson, Millstone, N.J., assignor to Colgate-Palmolive Company, Jersey City, N.J., a corporation of Delaware
No Drawing. Filed Sept. 12, 1955, Ser. No. 533,902
8 Claims. (Cl. 252—321)

This invention is of a process for destroying the foam of an ionic surface active agent by treating the foam with a suitable ion exchange resin.

Thousands of compositions for the control of foam have been manufactured, patented and utilized in many diverse industrial applications. Among the active foam inhibitory ingredients of such compositions are the various well-known complex amine compounds, the silicones, fatty acids and so forth. These additievs are generally fluid or are soluble in the liquid phase of the foam and consequently, when added thereto, will to a certain extent adulterate that phase after destroying the foam. After treatment with the conventional foam inhibitors such liquids cannot readily be foamed again. In addition the foam destroying additive, often a relatively costly item, is lost and in some cases its presence will even affect adversely the end products in which the solution components are incorporated.

In accordance with the present invention a foam comprising a gaseous phase dispersed in a solution of an ionic surface active agent in a polar solvent is destroyed by treatment of the foam with an ion exchange resin capable of exchanging its mobile ion for the active ion of the surface active agent.

The foam destroying agent of this invention, because of its insolubility, does not adulterate the treated solution; in some instances only the component ions of water are added to the solution while in other cases lower molecular weight anions or cations are added, in exchange for the active ion of the surface active agent. As a consequence, after defoaming, should one so desire, the foam-free liquid phase can once again be foamed, which is a property valuable in flotation processes. The ion exchange resin of the present invention may also be regenerated by comparatively simple and inexpensive well-known processes and may be used over again, and the active foaming ingredient may be recovered prior to regeneration or as a part of that operation.

Depending upon the type of surface active agent in the foam either cation or anion exchangers may be employed.

The cation exchangers include the natural and synthetic zeolites (Zeo-Dur, glauconite, kaolinite, montmorillonite, Decalso), sulfonated coal (Zeo-Karb), carboxylic acid resins, (Duolite CS–101, Permutit H–70, Amberlite IRC–50), the phosphonic acid resins (Duolite C–61, Permutit XP and the sulfonated resins. The sulfonated resins are usually either of the phenol formaldehyde type (Duolite C–3, Duolite C–10) or the cross-linked polystyrene copolymer type (Duolite C–20, Duolite C–26, Nalcite HCR (Dowex 50), Permutit Q, Amberlite IR–120, Duolite C–25, Nalcite MCR, Amberlite IR–112).

The anion exchangers are generally synthetic resin amine derivatives or synthetic resin quaternary ammonium compounds. They include Dowex 1–X 10, Duolite A–2, Duolite A–4, Duolite A–6, Duolite A–7, Nalcite WBR, De-Acidite, Permutit W, Amberlite IR–48, Amberlite IR–45, Duolite A–30, Duolite A–70, Permutit A, Nalcite SBR (Dowex 1), Permutit S–1, Amberlite IRA–400, Amberlite IRA–401, Duolite A–40, Duolite A–41, Nalcite SAR (Dowex 2), Permutit S–2, Amberlite IRA–410, Amberlite IRA–411.

The trademarks listed above are owned by the following companies:

Dow Chemical Co., Midland, Michigan: Dowex
Rohm and Haas Co.: Amberlite
The Permutit Co.:
  Decalso
  Zeo-Dur
  Zeo-Karb
  Permutit
  De-Acidite
National Aluminate Corp.: Nalcite
Chemical Process Co.: Duolite Methods of manufacturing these compounds are well-known. To make the synthetic resin exchangers one condenses a suitable ion active compound with resin-forming reactants. For example a cation exchanger may be made by condensing phenol with formaldehyde and sodium sulfite (the "ion-active" material) or by the co-condensation of phenol with benzaldehyde sulfonic acid. Instead of using phenol formaldehyde resins one may employ polystyrene in which case after the condensation of the ion-active material with polystyrene the resulting copolymer may be cross-linked with divinyl benzene. The carboxylic and phosphonic acid resins can be prepared in a manner similar to that employed for making the sulfonated resins.

Anion exchange resins can be made by condensing aromatic amines, e.g. aniline or m-phenylene diamine with formaldehyde. Alkyl groups may be incorporated into the resins during preparation to form quaternary ammonium bases or co-condensation with aliphatic polyamines may be employed. Dowex 1–X 10 is an example of an anion exchange resin possessing quaternary groups. It is of the formula:

where R is derived from polystyrene cross-linked with about 10% divinyl benzene.

The foams that may be treated with the ion exchange resins according to the processes of this invention are those formed by the dispersion of a gas in a film of liquid from a solution of an ionic surface active agent in a polar solvent. Generally the gas will be air but it may be another gaseous element or compound, e.g. nitrogen. The ionic surface active agent may be either anionic or cationic. The anionics include the following compounds, generally in the form of their soluble salts: carboxylic acids, e.g., fatty acids; the sulfuric acid esters, e.g., the sulfated fatty alcohols, the fatty acid esters of monosulfated polyhydric alcohols, coco fatty acid monoglyceride monosulfate; the alkane sulfonic acids, e.g., Igepon T; the alkyl aromatic sulfonic acids, e.g., the monosulfonated alkyl benzenes wherein the alkyl group is an aliphatic group of from 10 to 18 carbon atoms. Cationic surface active agents include: the amine salts (primary, secondary or tertiary amines), the quaternary ammonium compounds, e.g., cetyl trimethyl ammonium bromide; other nitrogenous bases, e.g. guanidine salts; quaternary bases; and non-nitrogenous bases including phosphonium and sulfonium bases. The foams to be treated may be those made from solutions of various concentrations of the ionic surface active agent. Usually the concentration will be less than 2%.

The polar solvent previously referred to will usually be water but may be another compound, e.g., lower molecular weight alcohol in which the surface active agent will ionize.

The ion exchange resin to be employed to destroy a foam must be one capable of exchanging its mobile ion for the active ion of the ionic surface active agent. The "mobile" ion of the resin is a small ion of low molecular weight, e.g., $Na^+$, $H^+$, $Cl^-$ or $OH^-$. The "active" ion of the surface active agent is the one containing both hydrophilic and lipophilic groups. It gives the compound its surface active properties. In the case of sodium alkyl aryl sulfonate, for example, the active ion is the alkyl aryl sulfonate anion. Thus it is seen that anion exchange resins will destroy the foams of anionic detergents while cation exchange resins will break cationic foams.

The treatment of the foam to be destroyed may be conducted in a number of possible ways. The ion exchange resin may be reduced to particulate form and may be added to the foam by sprinkling it or otherwise distributing it over the surface thereof. The smaller the particle size of the exchange resin the more surface is presented to the active ion of the surface active agent in the foam and the quicker the exchange takes place. This consideration should be taken into account when selecting the particle size range of the exchange resin. However, convenience of use, avoidance of dusting, ease of recovery of resin from the foam or the solution on which it rests, may make it desirable in some instances to employ larger size particles of resin.

The resin need not be distributed in dry form. It may be dispersed in a liquid carrier. This dispersion in a liquid makes it feasible to apply the exchange resin to the foam by spraying it through an atomizing nozzle. In either case it is desirable to effect maximum contact between the foam and resin and consequently intimate mixing of the two after addition of the resin should be employed. Needless to say such mixing should not be of the type which would tend to generate a copious foam.

Although the above treatment will result in the destruction of foam there is sometimes created a new problem, that of separating the particulate resin from the solution or slurry resulting from breaking the foam, or upon which the foam originally rested. If the liquid is a non-viscous solution the resin can be filtered out from it or separated by settling. If it is a viscous slurry or solution such separation might be difficult. In such instances, in a preferred embodiment of this invention, the ion exchange resin is employed in a porous cloth-like form. The cloth of resin filaments can be applied to the foam and after destroying it, can be removed and used for treating more foam until the resin's exchange power is exhausted. When exhausted the resin may be regenerated by the normal processes and during such regeneration the surface active agent may be recovered. Alternatively the foam can be pumped or otherwise moved through the permeable resin cloth.

The resin cloth referred to may be made by extruding a suitable ion exchange resin into thin thread-like form and then weaving it into cloth. Instead of the extrusion method which necessitates the possession of a high degree of flexibility by the resin the resin may be cut into thin strips and woven into an ordinary textile cloth. Alternatively the resin particles may be cemented to a permeable carrier fabric.

Because the ion exchange resin has an affinity for all ions of the proper sign the processes of this invention will be most satisfactory when used to destroy foams of solutions containing relatively small amounts of said ions other than those from the surface active agent itself. Even where the solution contains only the ion of the surface active agent the resin should preferably be kept out of contact with the solution proper in order to conserve it because the solution ions will tend to exchange with the mobile ions of the resin and decrease its useful life. When the liquid from which the foam was generated contains other ions which tend to exhaust the resin it is especially important that the resin should contact only the foam.

The weight of resin to be used to destroy a given volume of a foam depends on the particular resin and the amount and kind of surface active agent in the foam, as well as on the degree of contact between resin and foam. Usually an effective amount of resin between .05 lb. and 1 lb. resin will be employed to rapidly break 100 gallons of foam. These amounts may be lowered by utilizing a countercurrent treating system whereby the foam is treated first with nearly exhausted resin and later by more active resin.

After exhaustion of the resin the surface active agent can be recovered by the standard elution methods. Isopropanol-water and ethanol-water mixtures, and ethylene glycol have been found to be useful eluents. Usually it is desirable that the eluent contain in solution a sufficient amount of the same ion that was the mobile ion of the ion exchange resin. This will regenerate the ion exchange resin and will also result in the surface active agent being recovered in its original form.

The following examples are given to indicate the nature of the invention. It will be apparent that these examples are merely illustrative and the invention is not to be limited thereto.

EXAMPLE I

The cation exchangers Zeo-Dur (a processed glauconite) and Decalso (a precipitated gel type sodium alumino silicate), and the anion exchangers De-Acidite (a resin of weak basicity) and Permutit A (an exchange resin of medium basicity), all manufactured by The Permutit Co., were ground and sized.

The following water solutions of detergents were prepared:

*Anionic*

(1) 0.3% salt-free sodium lauryl sulfate.

(2) 0.3% of a heavy duty built spray dried detergent containing 35% of alkyl benzene sulfonate (the alkyl group being an aliphatic group of 12 to 15 carbon atoms), 40% pentasodium tripolyphosphate, 7½% sodium silicate, 7½% sodium sulfate and 10% of a mixture of sodium chloride, sodium carboxymethyl cellulose, perfume and water, hereafter called built alkyl benzene sulfonate.

*Cationic*

0.5% of cetyl trimethyl ammonium bromide.

A foam column in which these experiments are conducted consists of a jacketed graduated vertical cylindrical tube open at the top and connected at the bottom through a valve to a source of gas. The tube wall is marked in milimeters. The total volume of the inner tube is 220 ml.

The foam column is filled with foam by first placing a predetermined amount of surface active agent in solution inside the column and then admitting nitrogen to the bottom of the column via a platinum-rhodium spinneret, the upstream pressure of the nitrogen being controlled by a manostat to obtain an average bubble diameter of approximately 1.3 mm.

Fifty ml. of detergent solution is introduced by means of a pipette at the top of the foam column in such a manner that a minimum amount of foam is generated. The detergent solution is at 80° F. and the tube containing it is jacketed with air at room temperature.

Bubbling is started by opening the nitrogen supply valve and permitting the foam generated to substantially fill the column.

Four ml. of 10% by weight water suspension of ion exchange resin are drawn into a hypodermic syringe and immediately after the bubbles fill the column the heights of foam and solution are noted and 2 ml. of the suspension are added to the top of the foam. The foam and liquid heights are real 1 minute and 2 minutes after the resin addition and another 2 ml. of resin suspension is added, the foam and liquid heights being read again 1 minute and 2 minutes after this second resin addition. As will be seen by reference to the tables occasionally deviations from this method were made.

As a control the foam and liquid heights of untreated foams were also noted 1, 2, 3 and 4 minutes after generation.

The following Tables I, II and III show the comparative foam destroying ability of typical anionic and cationic exchanging resins on typical anionic and cationic surface active agent foams. Table IV gives data on stability of untreated foams (controls).

TABLE I

| Surface Active Agent | Concentration of Surface Active Agent (weight percent in water) | Resin | Resin Particle Size (U.S. Standard Sieve Size) | Time (minutes after generation of maximum volume of foam) | Total Volume of 10% Resin Suspension Added (ml.) | Volume of Foam (ml.) | Foam destroyed (percent) |
|---|---|---|---|---|---|---|---|
| Sodium Lauryl Sulfate (salt-free). | 0.3 | Permutit A (anion exchanger). | through 60 mesh, on 80 mesh. | 0 | 0 | 196 | 0 |
| | | | | 0 | 2 | | |
| | | | | 1 | | 163 | 17 |
| | | | | 2 | | 151 | 23 |
| | | | | 2 | 4 | | |
| | | | | 3 | | 106 | 46 |
| | | | | 4 | | 76 | 61 |
| | | Permutit A. | through 200 mesh. | 0 | 0 | 179 | 0 |
| | | | | 0 | 2 | | |
| | | | | 1 | | 121 | 32 |
| | | | | 1 | 4 | | |
| | | | | 2 | | 67 | 62 |
| | | | | 3 | | 49 | 72 |
| | | De-Acidite (anion exchanger). | through 60 mesh, on 80 mesh. | 0 | 0 | 177 | 0 |
| | | | | 0 | 2 | | |
| | | | | 1 | | 159 | 10 |
| | | | | 2 | | 154 | 13 |
| | | | | 2 | 4 | | |
| | | | | 3 | | 133 | 25 |
| | | | | 4 | | 124 | 30 |
| | | Decalso (cation exchanger). | do | 0 | 0 | 175 | 0 |
| | | | | 0 | 2 | | |
| | | | | 1 | | 171 | 2 |
| | | | | 2 | | 171 | 2 |
| | | | | 2 | 4 | | |
| | | | | 3 | | 171 | 2 |
| | | | | 4 | | 171 | 2 |
| | | Decalso | through 200 mesh. | 0 | 0 | 180 | 0 |
| | | | | 0 | 2 | | |
| | | | | 1 | | 175 | 3 |
| | | | | 1 | 4 | | |
| | | | | 2 | | 165 | 9 |
| | | | | 3 | | 165 | 9 |
| | | Zeo-Dur (cation exchanger). | through 60 mesh, on 80 mesh. | 0 | 0 | 184 | 0 |
| | | | | 0 | 2 | | |
| | | | | 1 | | 171 | 7 |
| | | | | 2 | | 165 | 10 |
| | | | | 2 | 4 | | |
| | | | | 3 | | 158 | 14 |
| | | | | 4 | | 154 | 16 |

TABLE II

| Surface Active Agent | Concentration of Surface Active Agent (weight percent in water) | Resin | Resin Particle Size (U.S. Standard Sieve Size) | Time (minutes after generation of maximum volume of foam) | Total Volume of 10% Resin Suspension Added (ml.) | Volume of Foam (ml.) | Foam destroyed (percent) |
|---|---|---|---|---|---|---|---|
| Built Alkyl Benzene Sulfonate. | 0.3 | Permutit A. (anion exchanger). | through 100 mesh, on 200 mesh. | 0 | 0 | 181 | 0 |
| | | | | 0 | 2 | | |
| | | | | 1 | | 76 | 58 |
| | | | | 2 | | 63 | 65 |
| | | | | 2 | 4 | | |
| | | | | 3 | | 4.7 | 97 |
| | | | | 4 | | 1 | 99.5 |
| | | De-Acidite (anion exchanger). | do | 0 | 0 | 177 | 0 |
| | | | | 0 | 2 | | |
| | | | | 1 | | 148 | 17 |
| | | | | 2 | | 143 | 19 |
| | | | | 2 | 4 | | |
| | | | | 3 | | 127 | 28 |
| | | | | 4 | | 98 | 44 |
| | | Decalso (cation exchanger). | do | 0 | 0 | 183 | 0 |
| | | | | 0 | 2 | | |
| | | | | 1 | | 183 | 0 |
| | | | | 1 | 4 | | |
| | | | | 2 | | 174 | 5 |
| | | | | 3 | | 170 | 7 |

TABLE III

| Surface Active Agent | Concentration of Surface Active Agent (weight percent in water) | Resin | Resin Particle Size (U.S. Standard Sieve Size) | Time (minutes after generation of maximum volume of foam) | Total Volume of 10% Resin Suspension Added (ml.) | Volume of Foam (ml.) | Foam destroyed (percent) |
|---|---|---|---|---|---|---|---|
| Cetyl Trimethyl Ammonium Bromide. | 0.5 | Zeo-Dur (cation exchanger). | through 60 mesh, on 80 mesh. | 0 | 0 | 179 | 0 |
| | | | | 0 | 2 | | |
| | | | | 1 | ------- | 82 | 54 |
| | | | | 2 | ------- | 71 | 60 |
| | | | | 2 | 4 | | |
| | | | | 3 | ------- | 0 | 100 |
| | | | | 4 | ------- | 0 | 100 |
| | | Decalso (cation exchanger). | ----do---- | 0 | 0 | 183 | 0 |
| | | | | 0 | 2 | | |
| | | | | 1 | ------- | 100 | 45 |
| | | | | 2 | ------- | 87 | 52 |
| | | | | 2 | 4 | | |
| | | | | 3 | ------- | 0 | 100 |
| | | | | 4 | ------- | 0 | 100 |
| | | De-Acidite (anion exchanger). | ----do---- | 0 | 0 | 180 | 0 |
| | | | | 0 | 2 | | |
| | | | | 1 | ------- | 148 | 18 |
| | | | | 2 | ------- | 144 | 20 |
| | | | | 2 | 4 | | |
| | | | | 3 | ------- | 123 | 32 |
| | | | | 4 | ------- | 118 | 34 |

TABLE IV

| Surface Active Agent | Concentration of Surface Active Agent (weight percent in water) | Time (minutes after generation of maximum volume of foam) | Volume of Foam (ml.) | Foam Destroyed (Percent) |
|---|---|---|---|---|
| Sodium Lauryl Sulfate. | 0.3 | 0 | 177 | 0 |
| | | 1 | 177 | 0 |
| | | 2 | 174 | 1.7 |
| | | 3 | 173 | 2.3 |
| | | 4 | 173 | 2.3 |
| Built Alkyl Benzene Sulfonate. | 0.3 | 0 | 176 | 0 |
| | | 1 | 173 | 1.7 |
| | | 2 | 171 | 2.8 |
| | | 3 | 171 | 2.8 |
| | | 4 | 170 | 3.4 |
| Cetyl Trimethyl Ammonium Bromide. | 0.5 | 0 | 174 | 0 |
| | | 1 | 174 | 0 |
| | | 2 | 174 | 0 |
| | | 3 | 174 | 0 |
| | | 4 | 174 | 0 |

EXAMPLE II

A 500 cc. column of foam was generated by bubbling nitrogen through a water solution of .2% sodium lauryl sulfate containing 3% lauryl alcohol on a sodium lauryl sulfate basis. The bubble size was approximately 1 mm. 10 cc. of a 10% solids suspension of finely powdered Dowex 1-X 10, an anionic exchange resin in the chloride form containing a quaternary ammonium group attached to a stryene—10% divinyl benzene copolymer, manufactured by Dow Chemical Company, were added at the top of the foam column. The Dowex 1-X 10 particles were those obtained by washing a column of this resin having a particle size between 100 and 200 mesh. They are the smaller particles within that size range. On addition of the resin the foam was destroyed rapidly and completely.

EXAMPLE III

A 500 cc. column of foam was generated according to the method of Example II from a 0.5% solution of the built alkyl benzene sulfonate of Example I. This foam was destroyed quickly by the addition of less than 5 cc. of a 10% solids suspension of Dowex 1-X 10.

The above examples and the data tabulated in Table I establish that the anion exchange resins have a definite foam destroying effect on foams generated from anionic surface active agents. Correspondingly the cation exchange resins destroy foams made from cationic surface active agents. Visual observation of the foams during treatment confirms these conclusions, the effect of the exchange resin particles being quite marked on foam bubbles in their immediate vicinity.

Some exchange resins are more effective against foams than are others. Some are especially effective against certain foams. One skilled in the art will utilize the most effective resin to destroy a particular foam.

The processes of the present invention are applicable in many industrial and chemical operations. In flotation processes, particularly ore flotation, the floating foam which often carries a desirable ore may be easily broken by treatment with suitable ion exchange resins and the ore may be conveniently recovered. The solution or slurry accompanying the foam or resulting from its destruction will not be rendered incapable of foaming because of contact with the ion exchange resin. It can be subsequently refoamed and additional floated ore may be recovered. Undesirable foam encountered in various sewage treatment processes may also be destroyed by suitable ion exchange resins without the introduction into the sewage slurry of chemicals inimical to the sewage decomposition processes.

The invented processes are also applicable in many of the normal chemical unit operations where foam is a problem, e.g. distillation, mixing, evaporation and so forth. For example in the recovery by batch distillation of alcohol from alcoholic aqueous solutions of synthetic detergents, particularly sodium coco fatty acid monoglyceride monosulfate, entrained detergent often causes the production of a foam on the still plates preventing proper rectification. The placing of a suitable ion exchange resin on or slightly above the surfaces of these plates, either in ground form or as a cloth will destroy this undesirable foam and allow proper rectification. It is preferable to treat the foam alone and to prevent contact of the ion exchange resin with the still charge in order to increase the useful life of the resin.

As an alternate general method for the destruction of foam the particular ion exchange resin may be suspended in water or other suitable polar solvent and undesired foam may be forced upward through the aqueous suspension.

While the present processes are directed to destroying foams they are often doubly advantageous because it is possible also to utilize them for analyzing foams for their composition of surface active agents without the necessity of first waiting for the foam to break or of adding foam destroying chemicals which might often interfere with the analysis.

The above invention has been described in conjunction with various examples illustrative of the method of destroying foam. It will be obvious to those skilled in the art that other variations and modifications of the invention can be made and various equivalents can be substituted therein without departing from the principles disclosed or going outside the scope of the specification or purview of the claims.

What is claimed is:

1. A process for destroying a foam composed of a gaseous phase dispersed in a solution containing an ionic surface active agent in a polar solvent, which comprises contacting the foam with an ion exchange resin capable of exchanging a mobile ion thereof for the active ion of the surface active agent, in amount effective to destroy foam and up to about 2 pounds of ion exchange resin per hundred gallons of foam.

2. A process according to claim 1 in which the ion exchange resin is in the form of a cloth.

3. A process according to claim 1 in which the ion exchange resin contacts only the foam.

4. A process according to claim 1 in which the polar solvent is water and the amount of ion exchange resin is from 0.05 to 1 pound per hundred gallons of foam.

5. A process according to claim 1 in which the ionic surface active agent is anionic and the ion exchange resin is an anion exchange resin.

6. A process according to claim 4 in which the ion exchange resin is a particulate solid.

7. A process according to claim 4 in which the ionic surface active agent is a cationic detergent and the ion exchange resin is a cation exchange resin.

8. A process according to claim 5 in which the polar solvent is water, the anionic surface active agent is an anionic detergent selected from the group consisting of water soluble sulfated and sulfonated synthetic organic detergents, and the amount of anion exchange resin is from 0.05 to 1 pound per 100 gallons of foam.

References Cited in the file of this patent

UNITED STATES PATENTS

| | | |
|---|---|---|
| 2,191,059 | Liebknecht | Feb. 20, 1940 |
| 2,251,234 | Swain | July 29, 1941 |
| 2,373,547 | D'Alelio | Apr. 10, 1945 |
| 2,551,197 | Barr | May 1, 1951 |
| 2,742,493 | Pines | Apr. 17, 1956 |